(12) United States Patent
Liu

(10) Patent No.: US 9,541,175 B2
(45) Date of Patent: Jan. 10, 2017

(54) AUTOMATICALLY COMPRESSING AND FRICTION-DRIVEN SPEED REDUCTION DEVICE

(71) Applicant: ZHEJIANG CHAOJI ELECTRIC TECH. CO., LTD., Zhejiang (CN)

(72) Inventor: Jun Liu, Zhejiang (CN)

(73) Assignee: ZHENJIANG CHAOJI ELECTRIC TECH. CO., LTD. (CN)

( * ) Notice: Subject to any disclaimer, the term of this patent is extended or adjusted under 35 U.S.C. 154(b) by 51 days.

(21) Appl. No.: 14/386,883

(22) PCT Filed: Mar. 22, 2013

(86) PCT No.: PCT/CN2013/073029
§ 371 (c)(1),
(2) Date: Sep. 22, 2014

(87) PCT Pub. No.: WO2013/139294
PCT Pub. Date: Sep. 26, 2013

(65) Prior Publication Data
US 2015/0045169 A1 Feb. 12, 2015

(30) Foreign Application Priority Data

Mar. 23, 2012 (CN) .......................... 2012 1 0081865
Mar. 23, 2012 (CN) ..................... 2012 2 0116791 U

(51) Int. Cl.
*F16H 13/08* (2006.01)
*F16H 13/14* (2006.01)
*F16H 57/08* (2006.01)

(52) U.S. Cl.
CPC .............. *F16H 13/08* (2013.01); *F16H 13/14* (2013.01); *F16H 57/08* (2013.01)

(58) Field of Classification Search
CPC .......... F16H 13/08; F16H 13/14; F16H 55/52; F16H 2057/014; F16H 2057/087
(Continued)

(56) References Cited

U.S. PATENT DOCUMENTS 1,737,997 A * 12/1929 Garrard ................... F16H 13/06
475/183
3,817,125 A * 6/1974 Nakamura .............. F16H 13/06
29/520

(Continued)

FOREIGN PATENT DOCUMENTS

| CN | 1503883 A | 6/2004 |
|---|---|---|
| CN | 1904409 A | 1/2007 |

(Continued)

OTHER PUBLICATIONS

International Search Report for PCT/CN2013/073029 and English Translation.

*Primary Examiner* — Justin Holmes
*Assistant Examiner* — Stacey Fluhart
(74) *Attorney, Agent, or Firm* — Garcia-Zamor IP Law; Ruy M. Garcia-Zamor

(57) ABSTRACT

An automatically compressing and friction-driven speed reduction device including a central shaft that is a cylinder, a planet wheel in a disc shape, and an inner compression ring and an outer compression ring sleeved outside the planet wheel; the maximum circumference part of the planet wheel is a planar excircle, and the surfaces on the two sides are machined into inclined planes having certain obliqueness; a planet shaft is installed in the middle of the planet wheel, and fixed on a housing; the planet shaft and the planet wheel are provided with a rolling needle therebetween. The device can automatically adjust frictional pressure in real time according to the magnitude of load torque, thus greatly reducing friction loss, improving the efficiency of friction-driven (Continued)

speed reduction device, and prolonging the service life of the friction-driven speed reduction device.

4 Claims, 2 Drawing Sheets

(58) Field of Classification Search
USPC .......................................................... 475/183
See application file for complete search history.

(56) References Cited

U.S. PATENT DOCUMENTS

| | | | | |
|---|---|---|---|---|
| 4,052,915 A | * | 10/1977 | Kraus | F16H 13/06 475/183 |
| 4,126,060 A | * | 11/1978 | Rineer | F16H 13/06 475/183 |
| 5,046,996 A | * | 9/1991 | Horvath | F16H 13/06 475/183 |
| 5,688,201 A | * | 11/1997 | Zhou | F16H 13/06 475/183 |
| 6,595,889 B2 | * | 7/2003 | Minegishi | F16D 7/005 475/182 |
| 7,029,414 B2 | * | 4/2006 | Ai | F16C 19/50 180/372 |
| 2004/0097325 A1 | | 5/2004 | Kolstrup | |
| 2011/0247904 A1 | | 10/2011 | Yamasaki | |

FOREIGN PATENT DOCUMENTS

| | | |
|---|---|---|
| CN | 101737468 A | 6/2010 |
| CN | 102165220 A | 8/2011 |
| CN | 102226463 A | 10/2011 |
| EP | 2345830 A1 | 7/2011 |
| JP | 63-195459 A | 8/1988 |
| JP | 2005-186667 A | 7/2005 |

* cited by examiner

AUTOMATICALLY COMPRESSING AND FRICTION-DRIVEN SPEED REDUCTION DEVICE

CROSS REFERENCE TO RELATED APPLICATIONS

This application claims priority to the following patent applications: (1) Patent Cooperation Treaty Application PCT/CN2013/073029 filed Mar. 3, 2013; (2) Chinese Patent Application CN 201210081865.6, filed Mar. 23, 2012; and (3) Chinese Patent Application CN 201220116791.0, filed Mar. 23, 2012; each of the above cited applications is hereby incorporated by reference herein as if fully set forth in its entirety.

TECHNICAL FIELD

The present invention belongs to the field of motor speed reduction driving parts, and in particular, it relates to an automatically compressing and friction-driven speed reduction device.

BACKGROUND ART

The friction pressure of the existing friction-driven speed reduction device is preset and constant, the pressure is constant no matter how the load torque changes, which causes large friction loss in small torque, or may cause exceeding the preset torque, slipping and burning-out in large torque; and with the increase of friction loss, the torque of the system will become smaller and smaller, finally lose efficacy quickly; therefore, the industry hopes to develop a friction-driven speed reduction device that can automatically adjust the frictional pressure according to the magnitude of load torque.

SUMMARY OF THE INVENTION

The object of the present invention is to overcome the above defects, and provide an automatically compressing and friction-driven speed reduction device capable of automatically adjusting frictional pressure in real time according to the magnitude of load torque, greatly reducing friction loss, improving the efficiency of friction-driven speed reduction device, and prolonging the service life of the friction-driven speed reduction device.

Therefore, the present invention adopts the following technical scheme: an automatically compressing and friction-driven speed reduction device, wherein the device comprises a central shaft, a planet wheel, and an inner compression ring and an outer compression ring sleeved outside the planet wheel; the central shaft is a cylinder; the planet wheel is in a disc shape; the maximum circumference part of the planet wheel is a planar excircle, and the surfaces on the two sides are machined into inclined planes having certain obliqueness; a planet shaft is installed in the middle of the planet wheel, and fixed on a housing; the planet shaft and the planet wheel are provided with a rolling needle therebetween so as to reduce frictional resistance; the inner compression ring and the outer compression ring are provided with coarse-pitch multi-fluted threads thereon, and can relatively rotate; the incircle surfaces on the inner sides of the inner compression ring and the outer compression ring are machined into inclined planes having the same obliqueness with the surfaces on the two sides of the planet wheel; the inner compression ring and the outer compression ring are provided with a tension spring therebetween, so as to preset a less pressure for the device, and prevent the two compression rings from looseness.

As a further improvement and supplement to the above scheme, the invention also includes the following technical scheme.

The surfaces on the two sides of the planet wheel, and the inner sides on the incircle surfaces of the inner compression ring and the outer compression ring are machined into inclined friction planes having the same angle, and the two sides of the planet wheel are provided with gaskets, so as to reduce the friction loss between the planet wheel and the housing.

The outer end surface of the planet shaft is sleeved with a positioning piece, and the positioning piece is fixed on the housing by screws.

The planet shaft can be fixed on the housing by said automatically compressing and friction-driven speed reduction device, the inner compression ring or the outer compression ring is used as the output end; or the inner compression ring or the outer compression ring can be firmly fixed on the housing, the planet wheel and the planet shaft are used as the output ends.

The present invention can achieve the following beneficial effects: the present invention can automatically adjust frictional pressure in real time according to the magnitude of load torque, thus reducing friction loss, greatly improving load capability and friction drive efficiency, and maintaining the advantages of low noise and little vibration for the friction drive; the present invention also can fix the inner compression ring or the outer compression ring on the housing according to the different application requirements, with the planet shaft as the output end; the present invention has simple structure and reliable work, and has achieved good effects through actual installation and use.

In figures, 1: Central shaft; 2: Planet wheel; 3: Inner compression ring; 4: Outer compression ring; 5: Tension spring; 6: Planet shaft; 7: Rolling needle; 8: Housing; 9: Gasket; 10: Positioning piece; 11: Screw.

DETAILED DESCRIPTIONS OF THE PREFERRED EMBODIMENTS

Combined with the appended drawings, the specific embodiments of the present invention are described in detail as follows.

Figure 1:
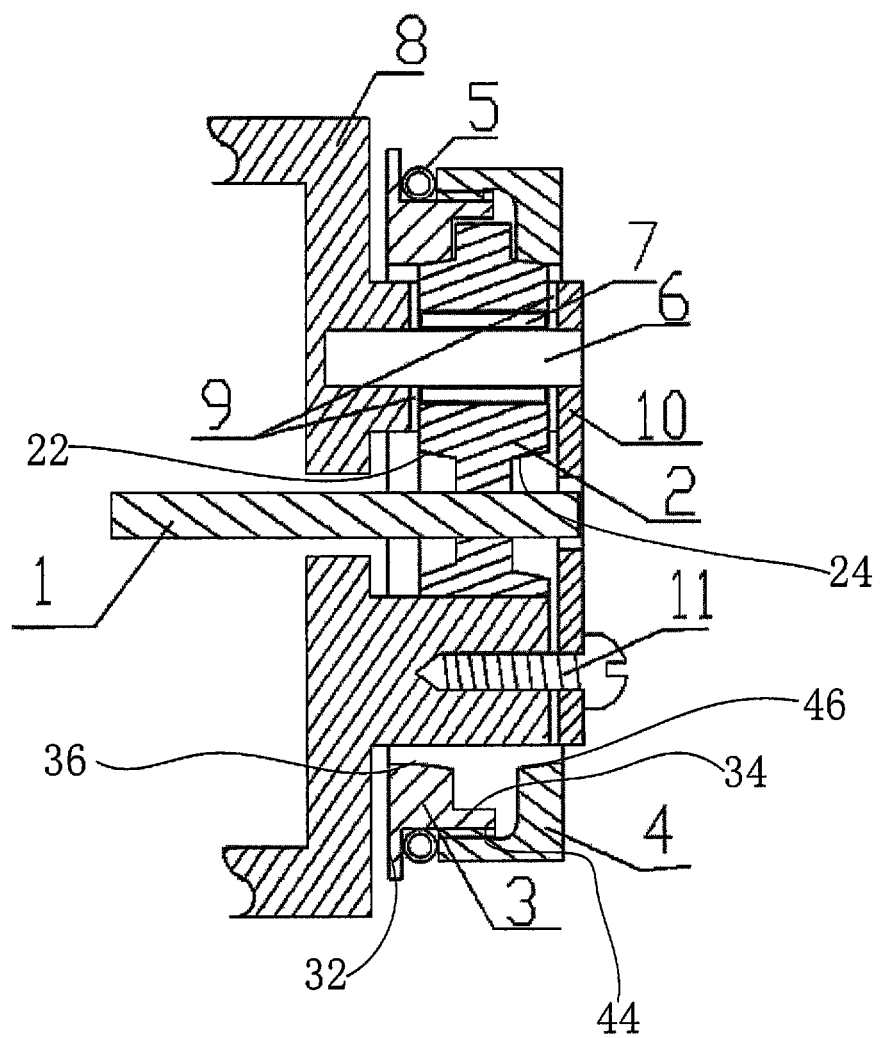
FIG. 1 is a sectional view of the present invention.
Figure 2:
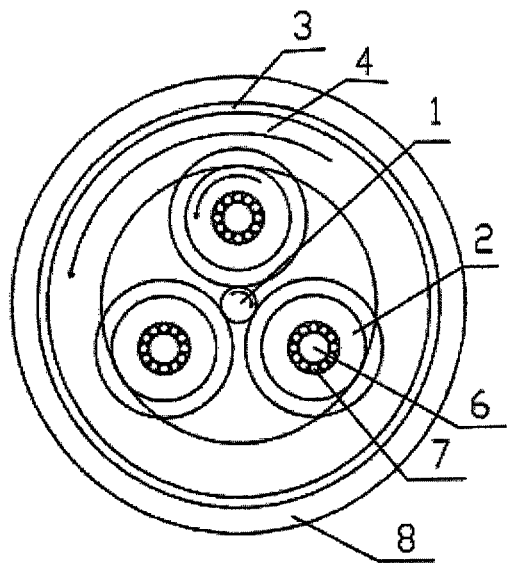
FIG. 2 is a main view and working principle diagram of the present invention after removing positioning generation.
Figure 3:
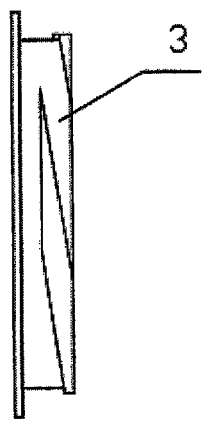
FIG. 3 is a side view of inner compression ring of the present invention.

As shown in FIGS. 1 to 3, the invention comprises a central shaft 1, three planet wheels 2 comprising a first inclined plane 22 and a second inclined plane 24, and an inner compression ring 3 and an outer compression ring 4 sleeved outside the planet wheel 2, wherein the inner compression ring 3 comprising a third inclined plane 36 having a same angle with the first inclined plane 22, a fixing portion 32 and a first connecting portion 34, and the outer compression ring 4 comprising a fourth inclined plane 46 having a same angle with the second inclined plane 24 and a second connecting portion 44; the central shaft 1, the planet wheels 2, the inner compression ring 3 and the outer compression ring 4 are all made of high-strength wear-resistant steel materials; the central shaft 1 is a cylinder; the planet wheels 2 are in disc shapes; a planet shaft 6 is installed in a middle of each planet wheel 2, and fixed on a housing 8; the two sides of the planet wheels 2 are provided with gaskets 9, the planet shaft 6 and each planet wheel 2 are provided with a rolling needle 7 therebetween so as to reduce frictional resistance; the first connecting portion 34 of the inner compression ring 3 and the second connecting portion 44 of the outer compression ring 4 are provided with coarse-pitch multi-fluted threads thereon, and can relatively rotate; a tension spring 5 is provide among the fixing portion 32 of the inner compression ring 3, the first connecting portion 34 of the inner compression ring 3 and the second connecting portion 44 of the outer compression ring 4, so as to preset a less pressure for the device, and prevent the two compression rings from looseness; the outer end surface of the planet wheel 2 is sleeved with a positioning piece 10, and the positioning piece 10 is fixed on the housing 8 by screws 11.

Installation process of the present invention is as follows: firstly installing and fixing the planet shaft 6 on the housing 8, and taking the central shaft 1 as an input shaft of power; installing the inner compression ring 3, then installing gasket 9, planet wheel 2, rolling needle 7 and gasket 9 on the planet shaft 6 in turn, and then screwing the outer compression ring 4 on the inner compression ring 3; installing pre-tensioning spring 5 between the inner compression ring 3 and the outer compression ring 4, fmally fixing the positioning piece 10 on the housing 8 by screws 11 for preventing axial movement of the planet wheel 2, and the present invention is assembled completely. In this embodiment, the outer compression ring 4 is taken as an output end of power; or the inner compression ring 3 or outer compression ring 4 can be fixed on the housing 8, the planet wheel 2 and the planet shaft 6 are taken as the output ends.

The operation process of embodiments of the invention shall be described in detail below with reference to the appended drawings, the described embodiment exemplarily displays the embodiments of the invention, fixing the inner compression ring 3 or outer compression ring 4 on the housing is also enforceable, with the planet shaft as the output mechanism.

As shown in FIG. 2, for example, when the input shaft 1 rotates in a clockwise direction, because a pre-tensioning spring 5 is arranged between the inner compression ring 3 and the outer compression ring 4, there is definite friction pressure between the compression ring and the planet wheel and the central shaft, the planet wheel 2 will rotate in counter-clockwise direction, and drive the inner compression ring 3 and the outer compression ring 4 to rotate in counter-clockwise direction; when the outer compression ring 4 is in increase of dynamic resistance torque, the inner compression ring 3 and the outer compression ring 4 will rotate more tightly because of the action of threads, which may increase the pressing force on inclined planes on both sides of the planet wheel 2, at the same time, the increased pressing force will act on the central shaft 1 through the plane in the middle of the planet wheel 2, so as to rise the friction pressure of the whole friction speed reduction device; when the external output torque is reduced, because the pitch of multi-fluted threads is large (generally greater than an angle of 7 degrees), the inner compression ring 3 and the outer compression ring 4 cannot maintain tightening state therebetween, the friction pressure of the whole friction speed reduction device will decrease accordingly. If the rotating direction of the input shaft is opposite to the rotating direction aforementioned, the thread rotating direction between the inner compression ring 3 and the outer compression ring 4 should also be in the opposite direction.

Applicability: As a transmission device, the present invention can be used for speed reduction drive in automotive, machinery, motor, engine or similar drive system, it has the advantages of automatically adjusting frictional pressure in real time according to the magnitude of load torque, low noise, large reduction ratio, being not easy to skid, high transmission efficiency, long service life, etc., and also can obtain remarkable economic benefits and social benefits after implementation.

The invention claimed is:

1. An automatically compressing and friction-driven speed reduction device, wherein the device comprises a central shaft (1), a planet wheel (2) comprising a first inclined plane and a second inclined plane, and an inner compression ring (3) and an outer compression ring (4) sleeved outside the planet wheel (2), wherein the inner compression ring (3) comprising a third inclined plane having a same angle with the first inclined plane, a fixing portion and a first connecting portion, and the outer compression ring (4) comprising a fourth inclined plane having a same angle with the second inclined plane and a second connecting portion; the central shaft (1) is a cylinder: the planet wheel (2) is in a disc shape; a planet shaft (6) is installed in a middle portion of the planet wheel (2), and fixed on a housing (8); the planet shaft (6) and the planet wheel (2) are provided with a rolling needle (7) therebetween so as to reduce frictional resistance; the first connecting portion of the inner compression ring (3) and the second connecting portion of the outer compression ring (4) are provided with multi-fluted threads thereon, and can relatively rotate; a tension spring (5) is provide between the fixing portion of the inner compression ring (3), and the first and second connecting portions, so as to preset definite pressures between the inner compression ring (3) and the outer compression ring (4), between the inner compression ring (3) or the outer compression ring (4) and the planet wheel (2), and between the planet wheel (2) and the central shaft (1), wherein the central shaft (1) rotates in a first direction, the planet wheel (2) rotates in a second direction opposite to the first direction and drives the inner compression ring (3) to rotate in second direction because the first inclined plane abuts against the third inclined plane and the outer compression ring (4) to rotate in second direction because the second inclined plane abuts against the fourth inclined plane, and wherein when the outer compression ring (4) is subjected to an increase in dynamic resistance torque, the inner compression ring (3) and the outer compression ring (4) rotate more tightly due to a relative rotating action of the threads, which increases a pressing force on the first and second inclined planes of the planet wheel (2) and the central shaft (1) through the planet wheel (2), so as to raise the friction pressure of the whole friction speed reduction device.

2. The automatically compressing and friction-driven speed reduction device according to claim 1, wherein two sides of the planet wheel (2) are provided with gaskets (9).

3. The automatically compressing and friction-driven speed reduction device according to claim 2, wherein an outer end surface of the planet shaft (6) is sleeved with a positioning piece (10), and the positioning piece (10) is fixed on the housing (8) by screws (11).

4. The automatically compressing and friction-driven speed reduction device according to claim 1, wherein the fixing portion is perpendicular to the first connecting portion.

* * * * *